United States Patent
Matsushita et al.

(10) Patent No.: US 8,131,082 B2
(45) Date of Patent: Mar. 6, 2012

(54) IMAGE PROCESSING APPARATUS CONFIGURED TO CALCULATE A RESOLUTION SUITABLE FOR THE SIZE OF A REGION TO BE PROCESSED AND METHOD FOR CONTROLLING THE SAME

(75) Inventors: Masahiro Matsushita, Yokohama (JP); Hirotaka Shiiyama, Yokohama (JP); Kazuyo Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 12/050,787

(22) Filed: Mar. 18, 2008

(65) Prior Publication Data
US 2008/0253660 A1 Oct. 16, 2008

(30) Foreign Application Priority Data
Apr. 12, 2007 (JP) ................. 2007-105252

(51) Int. Cl.
*G06K 9/46* (2006.01)
*G06K 15/02* (2006.01)
*G06K 9/32* (2006.01)
*G06K 9/54* (2006.01)
*G06F 7/00* (2006.01)

(52) U.S. Cl. ........ 382/190; 382/243; 382/299; 382/305; 707/729; 358/1.2

(58) Field of Classification Search .................. 382/190, 382/243, 299, 305; 358/1.2; 707/729
See application file for complete search history.

(56) References Cited

U.S. PATENT DOCUMENTS
6,483,609 B1 * 11/2002 Ueno et al. .................... 358/434

FOREIGN PATENT DOCUMENTS
| JP | 2000-090101 A | | 3/2000 | |
| JP | 2001-052010 A | | 2/2001 | |
| JP | 2001-109888 | * | 4/2001 | .................... 382/190 |

OTHER PUBLICATIONS

Unofficial translation of the above foreign patent document.*

* cited by examiner

*Primary Examiner* — Kathleen Y Dulaney
(74) *Attorney, Agent, or Firm* — Canon USA, Inc., IP Division

(57) ABSTRACT

A position and an area of a region to be processed, that is, a region from which image feature parameters are to be extracted, are obtained, and the number of pixels required for obtaining the usable image feature parameters is determined in accordance with types of the image feature parameters to be extracted. Then, a required resolution is calculated in accordance with the determined number of pixels and the area of the region to be processed, an image having a minimum resolution which is equal to or higher than the required resolution and which is usable to extract the usable image feature parameters is selected, and the image feature parameters are extracted from a region to be processed in the selected image.

8 Claims, 15 Drawing Sheets

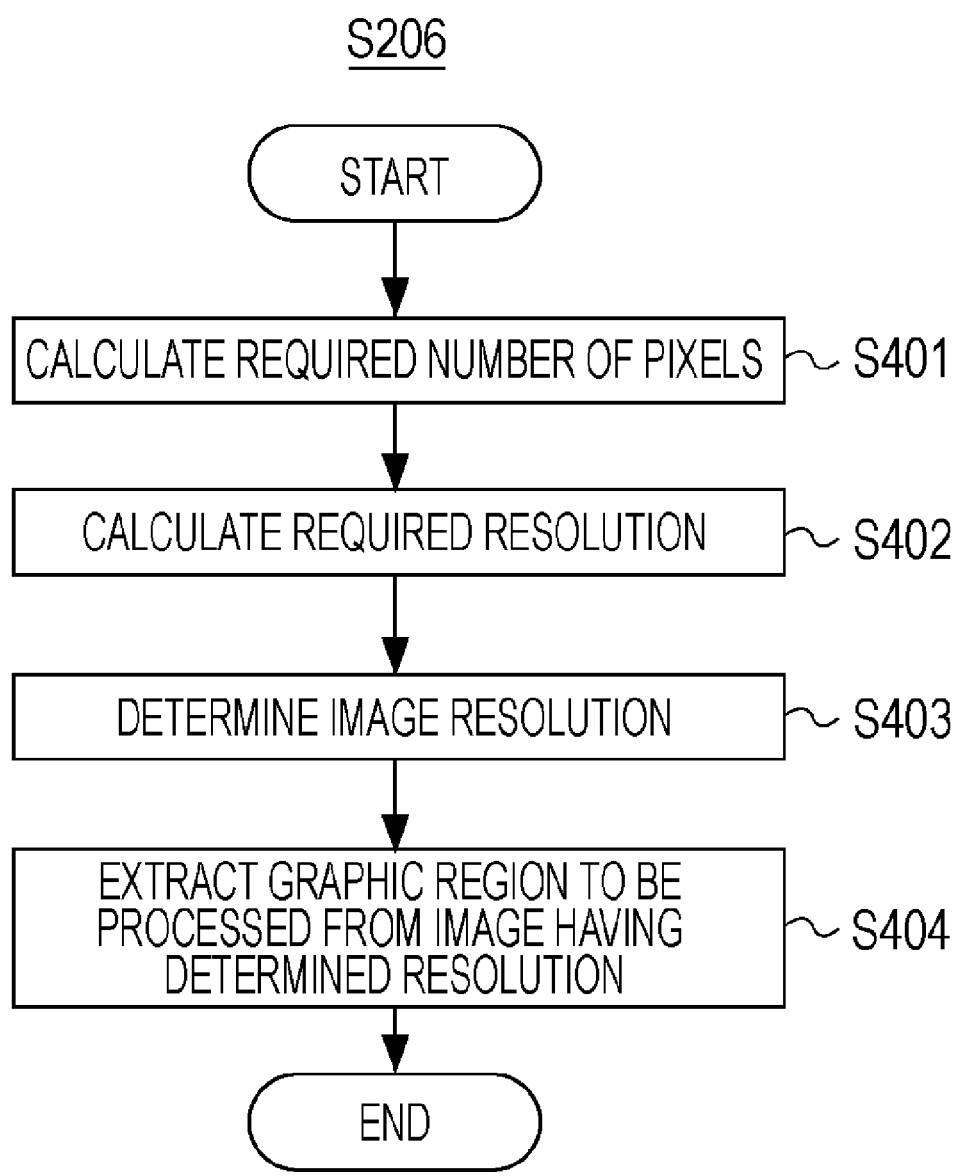

FIG. 5

| | | COLOR FEATURE PARAMETER | LUMINANCE FEATURE PARAMETER | EDGE FEATURE PARAMETER |
|---|---|---|---|---|
| COLOR IMAGE | APPLICATION IMAGE DATA | 50 PIXELS OR MORE | 50 PIXELS OR MORE | 150 PIXELS OR MORE |
| | SCANNED IMAGE DATA | 200 PIXELS OR MORE | 200 PIXELS OR MORE | 300 PIXELS OR MORE |
| GRAYSCALE IMAGE | APPLICATION IMAGE DATA | NOT AVAILABLE | 50 PIXELS OR MORE | 150 PIXELS OR MORE |
| | SCANNED IMAGE DATA | NOT AVAILABLE | 200 PIXELS OR MORE | 300 PIXELS OR MORE |
| BLACK AND WHITE BINARY IMAGE | APPLICATION IMAGE DATA | NOT AVAILABLE | 200 PIXELS OR MORE | 300 PIXELS OR MORE |
| | SCANNED IMAGE DATA | NOT AVAILABLE | 300 PIXELS OR MORE | 500 PIXELS OR MORE |

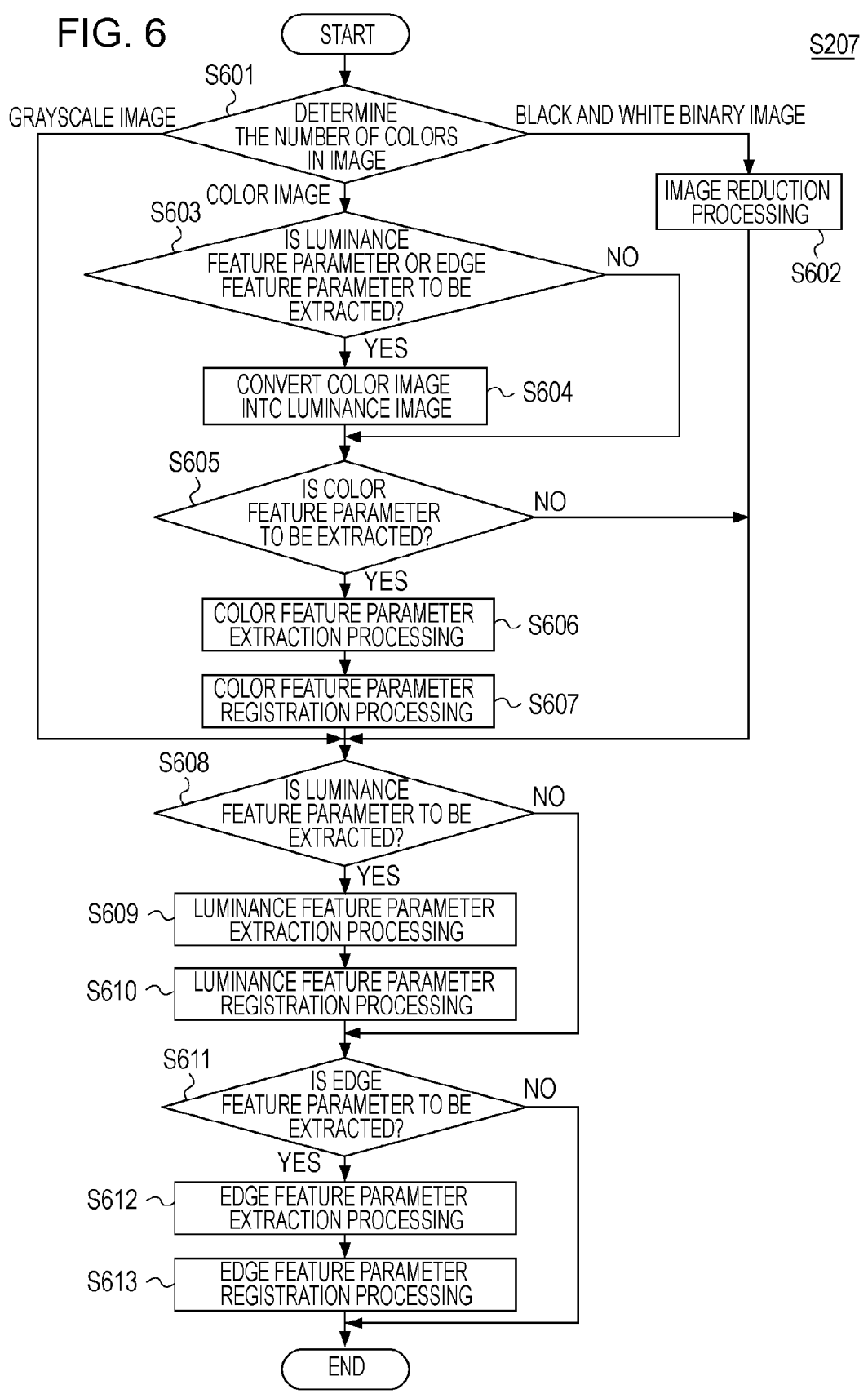

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
| 73 | 74 | 75 | 76 | 77 | 78 | 79 | 80 | 81 |

FIG. 12

| LUMINANCE VALUE | 0-31 | 32-63 | 64-95 | 96-127 | 128-159 | 160-191 | 192-223 | 224-255 |
|---|---|---|---|---|---|---|---|---|
| LUMINANCE LABEL VALUE | 0 | 1 | 2 | 3 | 4 | 5 | 6 | 7 |

FIG. 14

| 0 DEGREE | | |
|---|---|---|
| 1 | 1 | 1 |
| -1 | -2 | -1 |
| -1 | -1 | -1 |

| 45 DEGREES | | |
|---|---|---|
| -1 | -1 | 1 |
| -1 | -2 | 1 |
| 1 | 1 | 1 |

| 90 DEGREES | | |
|---|---|---|
| -1 | -1 | -1 |
| 1 | -2 | 1 |
| 1 | 1 | 1 |

| 135 DEGREES | | |
|---|---|---|
| 1 | -1 | -1 |
| 1 | -2 | -1 |
| 1 | 1 | 1 |

| 180 DEGREES | | |
|---|---|---|
| -1 | -1 | -1 |
| -1 | -2 | -1 |
| 1 | 1 | 1 |

| 225 DEGREES | | |
|---|---|---|
| 1 | -1 | -1 |
| 1 | -2 | -1 |
| 1 | 1 | -1 |

| 270 DEGREES | | |
|---|---|---|
| 1 | 1 | 1 |
| 1 | -2 | 1 |
| -1 | -1 | -1 |

| 315 DEGREES | | |
|---|---|---|
| 1 | 1 | 1 |
| -1 | -2 | 1 |
| -1 | -1 | 1 |

FIG. 15

| IMAGE ID | ORIGINAL IMAGE | NUMBER OF REDUCED IMAGE | REDUCED IMAGE 1 | REDUCED IMAGE 2 |
|---|---|---|---|---|
| 00000001 | 00000001.jpg | 2 | 00000001A.jpg | 00000001B.jpg |
| 00000002 | 00000002.jpg | 1 | 00000002A.jpg | - |
| 00000003 | 00000003.jpg | 1 | 00000003A.jpg | - |
| 00000004 | 00000004.jpg | 2 | 00000004A.jpg | 00000004B.jpg |

FIG. 16

| IMAGE ID | REGION ID | REGION ATTRIBUTE |
|---|---|---|
| 00000001 | 0001 | GRAPHIC |
| 00000001 | 0002 | GRAPHIC |
| 00000001 | 0003 | TEXT |
| 00000002 | 0001 | GRAPHIC |
| 00000002 | 0002 | TEXT |
| 00000003 | 0001 | GRAPHIC |
| 00000003 | 0002 | TEXT |
| 00000004 | 0001 | GRAPHIC |
| 00000004 | 0002 | TEXT |

FIG. 17

| IMAGE ID | REGION ID | IMAGE FEATURE PARAMETER | | |
|---|---|---|---|---|
| | | COLOR FEATURE PARAMETER | LUMINANCE FEATURE PARAMETER | EDGE FEATURE PARAMETER |
| 00000001 | 0001 | ... | ... | ... |
| 00000001 | 0002 | ... | ... | ... |
| 00000002 | 0001 | - | ... | ... |
| 00000003 | 0001 | - | ... | ... |
| 00000004 | 0001 | ... | ... | ... |

IMAGE PROCESSING APPARATUS CONFIGURED TO CALCULATE A RESOLUTION SUITABLE FOR THE SIZE OF A REGION TO BE PROCESSED AND METHOD FOR CONTROLLING THE SAME

BACKGROUND OF THE INVENTION

1. Field of the Invention

The present invention relates to image processing apparatuses, methods for controlling the same, storage media, and programs. The present invention particularly relates to a method for extracting image feature parameters used to retrieve an image.

2. Description of the Related Art

In general, various techniques of retrieving similar images have been proposed. In such a technique of retrieving similar images, image feature parameters extracted from a first image and corresponding image feature parameters extracted from a second image are compared with each other to calculate a degree of similarity, and an image retrieving processing is performed based on the calculated degree of similarity. In such similar image retrieving processing, generally, image feature parameters are extracted from images to be retrieved in advance and the images are associated with the image feature parameters and registered in an image database so that retrieving speed is improved. Furthermore, in a system in which images which are obtained by reducing original images in size (hereinafter referred to as "reduced images") are to be displayed as retrieval results, the reduced images are registered in the image database in advance. Accordingly, high-speed display of the retrieving results is attained.

The following method is disclosed as a method for extracting image feature parameters in a system including images of different resolutions.

For example, Japanese Patent Laid-Open No. 2000-090101 discloses a method for selecting a resolution as low as possible suitable for detecting feature parameters used for image retrieving processing, high-speed extraction of usable feature parameters is attained.

Meanwhile, Japanese Patent Laid-Open No. 2001-052010 discloses a method for, when image feature parameters used for the image retrieving processing are extracted, image data of the lowest resolution is used to reduce load of extraction processing.

In a case where image feature parameters are to be extracted from first and second images of resolutions different from each other but differences between the image feature parameters to be extracted from the first image and the corresponding image feature parameters to be extracted of the second image are negligible, the image feature parameters of one of the first and second images which has the lower resolution should be extracted first so that a high-speed operation is attained. Japanese Patent Laid-Open No. 2001-052010 further discloses a technique of selecting a resolution based on capability of an apparatus so that load of the extraction processing is optimized.

However, in a case where image feature parameters which considerably vary due to different resolutions of images are to be extracted, reliabilities of the image feature parameters to be extracted should be checked. For example, a technique of extracting image feature parameters for all registered resolutions has been proposed. In this case, however, it takes considerable time to extract the image feature parameters.

Furthermore, in this case, in a case where resolution of a registered image is considerably different from a resolution of a query image, image retrieving processing is not performed with high accuracy.

Furthermore, restriction on the number of pixels required for extracting usable image feature parameters is imposed. If the number of pixels is smaller than the number of required pixels, the image feature parameters may not be extracted or unusable image feature parameters are extracted, for example.

Note that the term "usable image feature parameters" means image feature parameters which do not considerably vary due to different methods for obtaining images or a small amount of deviation of regions from which the image feature parameters are extracted. That is, when the usable image feature parameters are employed, the image retrieving processing is performed with excellent reliability irrespective of different methods for obtaining images or a small amount of deviation of regions from which the image feature parameters are extracted between the query image and the registered image.

In general, the number of pixels in an image required for extracting usable image feature parameters depends on the number of colors in the image or types of the image feature parameters to be extracted. Accordingly, the usable image feature parameters may not be extracted from an image of the lowest resolution due to some conditions of the number of colors in the image or the types of the image feature parameters to be extracted.

In particular, in a case where image feature parameters are extracted from a region of an original image, when the region to be processed is small, usable image feature parameters may not be extracted from an image of the lowest resolution corresponding to the original image.

SUMMARY OF THE INVENTION

An embodiment of the present invention provides a technique of extracting image feature parameters at high speed under the condition wherein a plurality of images having different resolutions are stored.

An image processing apparatus according to an embodiment of the present invention is capable of storing or generating a plurality of images having the same contents and different resolutions. The image processing apparatus obtains a position and an area of a region to be processed, that is, a region from which image feature parameters are to be extracted, and determines a number of pixels required for obtaining the usable image feature parameters in accordance with the types of the image feature parameters to be extracted.

Then, a required resolution is calculated in accordance with the determined number of pixels and the area of the region to be processed, an image having a minimum resolution which is equal to or higher than the required resolution and which is usable to extract the usable image feature parameters is selected, and the image feature parameters are extracted from a region to be processed in the selected image.

Further features of the present invention will become apparent from the following description of exemplary embodiments with reference to the attached drawings.

BRIEF DESCRIPTION OF THE DRAWINGS

FIG. 4 is a flowchart illustrating image resolution selection processing in detail according to the exemplary embodiment.

FIG. 5 is an example of a table illustrating the numbers of pixels required for extracting image feature parameters according to the exemplary embodiment.

FIG. 6 is a flowchart illustrating image feature parameter extraction processing in detail according to the exemplary embodiment.

FIG. 12 is a diagram illustrating an example of a table used when a luminance value is converted into a luminance label value according to the exemplary embodiment.

FIG. 14 shows examples of a differential filter (Pewitt filter) according to the exemplary embodiment.

FIG. 15 is a diagram illustrating examples of pieces of image information which include image IDs, names of original images, the numbers of reduced images, and names of reduced images, and which are to be registered.

FIG. 16 is a diagram illustrating examples of pieces of image information which include the image IDs, region IDs, and region attributes, and which are to be registered according to the exemplary embodiment.

FIG. 17 is a diagram illustrating examples of pieces of image information which include the image IDs, the region IDs, and the image feature parameters and which are to be registered according to the exemplary embodiment.

DESCRIPTION OF THE EMBODIMENTS

Preferred exemplary embodiments of the present invention will be described hereinafter with reference to the accompanying drawings.

Configuration of Image Processing Apparatus for Control Processing

Figure 18:
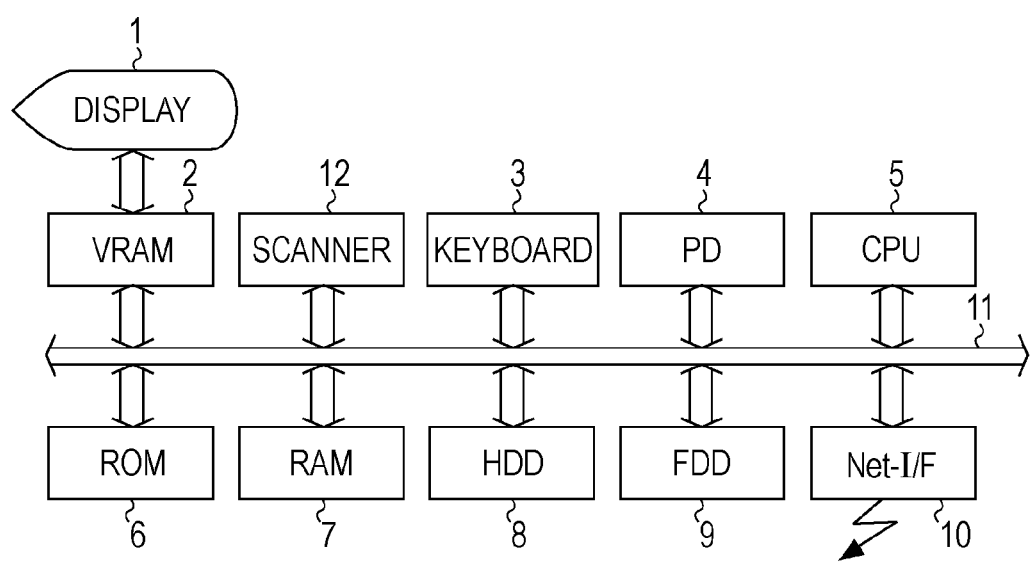
FIG. 18 is a block diagram illustrating a hardware configuration of the image processing apparatus according to the exemplary embodiment.

FIG. 18 is a block diagram illustrating a hardware configuration of an image processing apparatus according to an exemplary embodiment. The image processing apparatus according to this exemplary embodiment may be a dedicated apparatus which performs image processing which will be described hereinafter or may be realized by a general computer such as a personal computer in which a predetermined control program is installed therein so that the image processing which will be described hereinafter is performed.

In FIG. 18, a CPU 5 controls a display 1, which is a CRT (cathode ray tube) display, to display various message menus and information on data which is being processed using an application program. A VRAM (video RAM) 2 is used to develop an image displayed on a screen of the CRT 1. A keyboard 3 and a pointing device 4 are used to input characters, for example, in a predetermined area in the screen and to point buttons represented by icons and GUIs. The CPU 5 executes a control program stored in a ROM (read-only memory) 6 or a control program loaded in a RAM (random access memory) 7 so as to entirely control the image processing apparatus.

The ROM 6 stores a program of an operation processing procedure (control program) of the CPU 5 and a variety of data, for example. Note that, application programs relating to data processing, error processing programs, and programs relating to flowcharts which will be described later are stored in the ROM 6. The RAM 7 provides a work area when the CPU 5 executes the various programs described above and provides a temporary usage area at a time of error processing.

Application programs, data, libraries are stored or written in a hard disc drive (HDD) 8 or a flexible disc drive (FDD) 9. Instead of the FDD 9, a disc drive for optical (magneto-optical) discs such as CD-ROMs (compact disc read-only memories), MOs (magneto-optical discs), and DVDs (digital versatile disc), a drive for magnetic tapes such as a tape streamer or DDS (digital data storage) may be provided.

A network interface 10 is used to connect the apparatus to a network. An I/O bus (constituted by an address bus, a data bus, and a control bus) 11 is used to connect the units described above to one another. A scanner 12 generates image data by optically scanning a document image. Note that the scanner 12 may be connected to the apparatus through the network interface 10. In addition, a storage device, for example, which stores images may be connected to the apparatus through the network interface 10.

Figure 1:
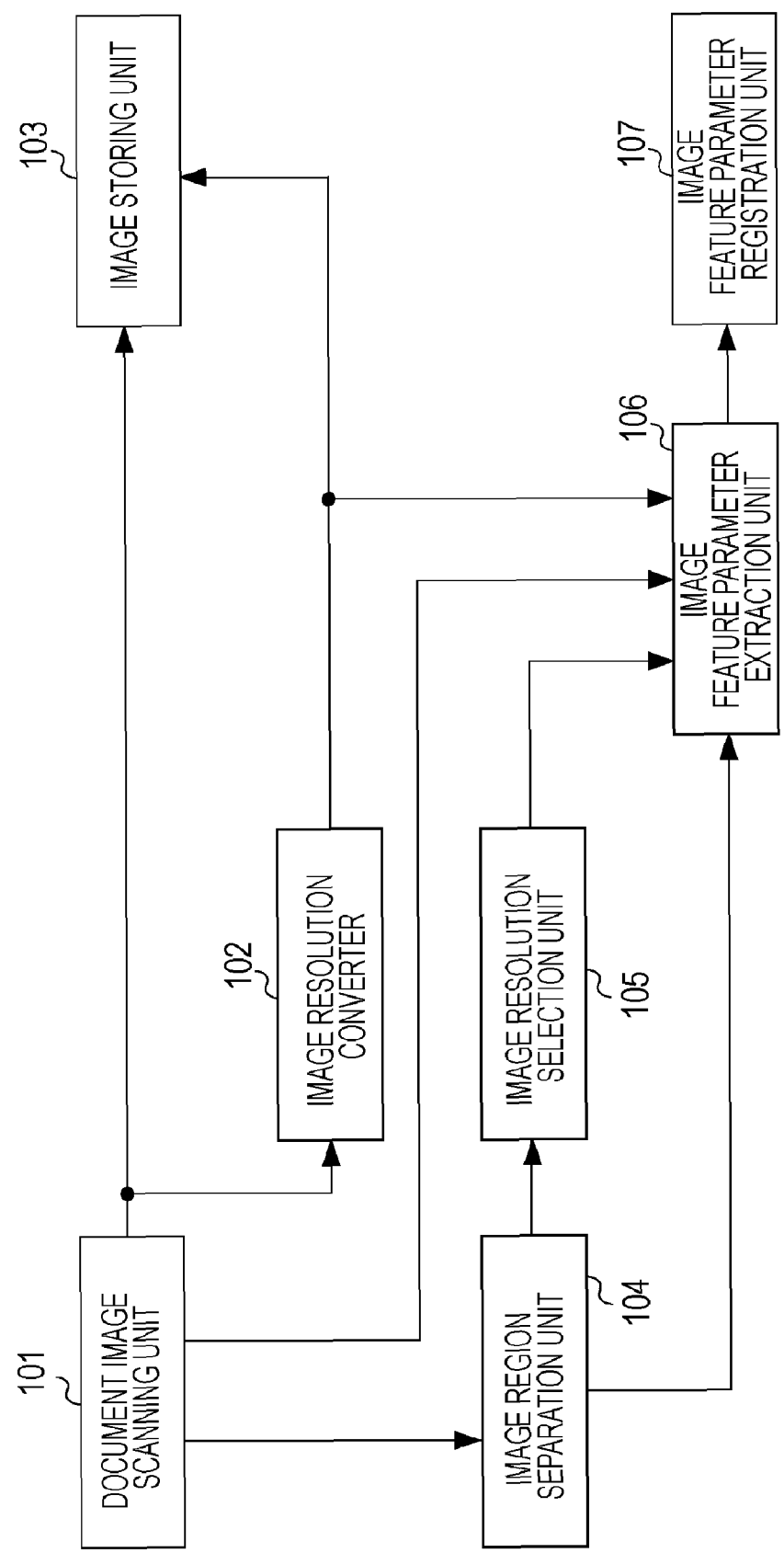
FIG. 1 is a block diagram illustrating a configuration of an image processing apparatus according to an exemplary embodiment of the present invention.

FIG. 1 is a block diagram illustrating a configuration of the image processing apparatus according to this exemplary embodiment. A document image scanning unit 101 includes the scanner 12 having an auto document feeder (ADF) and a platen glass, and scans an original placed on the platen glass to obtain an image of the original (hereinafter referred to as an "original document image"). The document image scanning unit 101 irradiates light from a light source (not shown) onto the original placed on the platen glass. The light which was irradiated onto the original and which was reflected by the original forms an image, that is, a document reflection image, on a solid-state image sensing element using a lens (not shown). Then, an image scanning signal in a raster form is obtained as a raster image having a predetermined density (for example, 600 DPI) using the solid-state image sensing element. Note that, although the document image scanning unit 101 scans a paper document on which an image is printed as an example in this exemplary embodiment, the present invention is not limited to this. For example, printed material including a recording medium other than paper (for example, OHP sheets, transparent material such as a film, or fabric) may be scanned.

An image resolution converter 102 reduces the size of the original document image obtained by scanning performed using the document image scanning unit 101 so as to obtain a reduced document image having a predetermined density (for example, 100 DPI). Specifically, the image resolution converter 102 changes a resolution of the original document image obtained using the document image scanning unit 101.

An image storing unit 103 corresponds to, for example, the HDD 8 or a storage device connected to the image processing apparatus through the network interface 10 which stores the original document image obtained using the document image scanning unit 101 and the reduced document image obtained using the image resolution converter 102.

An image region separation unit 104 analyzes the original document image obtained using the document image scanning unit 101, separates a graphic region from a text region in the original document image, and obtains pieces of coordinate information of the graphic region and the text region. An image resolution selection unit 105 selects one of resolutions which is used for extracting image feature parameters based on resolution information of the original document image, the number of colors of the original document image, information on a region from which image feature parameters are extracted, and types of image feature parameters to be extracted, for example. An image feature parameter extraction unit 106 extracts image feature parameters from a region specified based on region information using a reduced document image having the resolution selected by the image resolution selection unit 105. An image feature parameter registration unit 107 stores or registers the image feature parameters extracted using the image feature parameter extraction unit 106 in the HDD 8, for example, after the image feature parameters are associated with the image and the region information.

Note that the image resolution converter 102, the image storing unit 103, the image region separation unit 104, the image resolution selection unit 105, the image feature parameter extraction unit 106, and the image feature parameter registration unit 107 are realized by executing a predetermined control program using the CPU 5. Alternatively, functions thereof may be entirely or partially realized using a dedicated hardware.

Outline of Image Feature Parameter Extraction Processing

Figure 2:
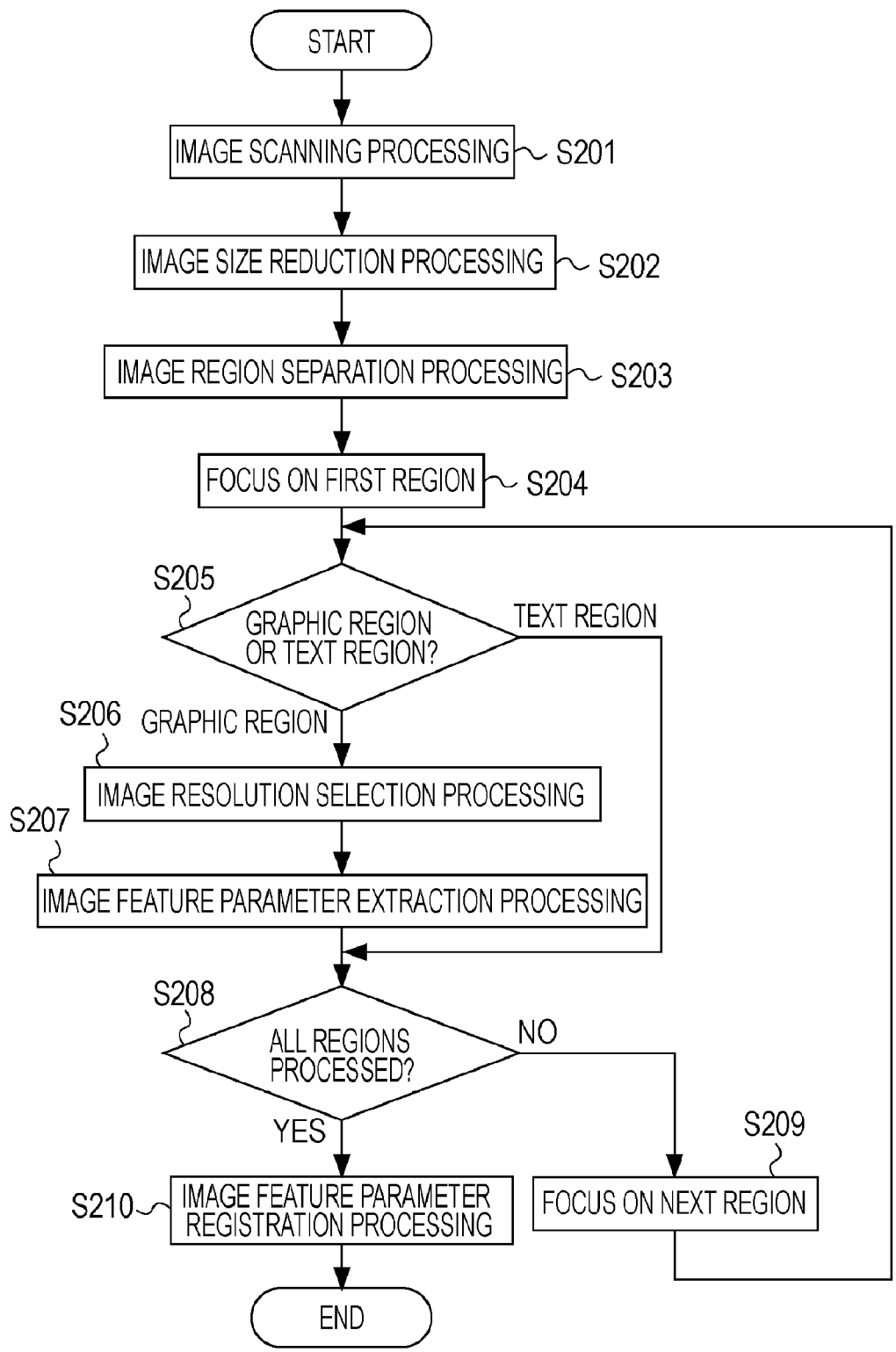
FIG. 2 is a flowchart illustrating image feature parameter extraction processing according to the exemplary embodiment.

Referring now to a flowchart shown in FIG. 2, image feature parameter extraction processing performed using the image processing apparatus according to this exemplary embodiment will be described in detail.

First, a user sets an original on the platen glass or the ADF of the document image scanning unit 101 and instructs the document image scanning unit 101 to scan the original to obtain an original document image. When receiving the instruction of the scanning of the original, the document image scanning unit 101 scans the original to obtain the original document image in step S201. Note that the document image scanning unit 101 scans the original with high resolution (600 DPI, for example) so that the original document image is edited or reprinted later. In step S202, the image resolution converter 102 performs image size reduction processing on the original document image obtained in step S201. Here, the original document image obtained in step S201 is reduced in size so that a reduced image having a low resolution (such as 100 DPI) which is to be included in a list of results of image retrieving processing or which is to be used to check an outline of the original document image on the screen, for example, is obtained. The original document image may be reduced in size so that a reduced image having a lower resolution to be included in a display list is obtained. Specifically, three or more image files or three or more document images having different resolutions may be generated from a single original document image by reducing the size of the original document image in a plurality of times and may be successively stored. As described above, the image storing unit 103 included in the image processing apparatus according to this exemplary embodiment stores therein a plurality of images having different resolutions generated from a single original document image.

In step S203, the image region separation unit 104 performs image region separation processing on the original document image obtained in step S201 so as to extract a graphic region and a text region. The image region separation processing performed in step S203 will be described later in detail. The following processing is performed on the graphic region and the text region extracted through the image region separation processing performed in step S203.

In step S204, a first region is determined to be a region of interest. In step S205, the image processing apparatus determines whether the region of interest is the graphic region or the text region. When it is determined that the region of interest is the graphic region, the process proceeds to steps S206 and S207 so that image feature parameters of the region of interest is extracted. On the other hand, when it is determined that the region of interest is the text region, the image feature parameters are not extracted and the process proceeds to step S208 from step S205. That is, it is determined that the region which is determined to be the text region is not a region to be processed.

In step S206, the image resolution selection unit 105 selects one of the resolutions which is preferably to be employed in the image feature extraction processing. In this exemplary embodiment, an image on which the image feature parameter extraction processing is to be performed is selected from among the original document image obtained in step S201 and the reduced images obtained in step S202. The image resolution selection processing performed in step S206 will be described later in detail. Then, in step S207, the image feature parameter extraction unit 106 extracts image feature parameters from one of the images having the resolution selected using the image resolution selection unit 105. The image feature parameter extraction processing performed in step S207 will be described later in detail.

In step S208, the image processing apparatus determines whether the processing from step S205 to step S207 has been performed on all regions obtained through the image region separation processing performed in step S203. When the determination is affirmative, the process proceeds to step S210 whereas when the determination is negative, the process proceeds to step S209. In step S209, the image processing apparatus sets the next region as the region of interest and the process returns to step S205.

When it is determined that all the regions have been processed, the image feature parameter registration unit 107 registers the image feature parameters therein in step S210. Image feature parameter registration processing performed in step S210 will be described later in detail.

Note that, although the regions extracted through the image separation processing performed in step S203 is divided into two types of region, that is, the graphic region and the text region in this exemplary embodiment, the present invention is not limited to these. For example, the graphic region may be further divided into a photo region, a picture region, a drawing region, and a table region, for example. Similarly, the text region may be divided into a caption region and a body region, for example. Although a color feature parameter, a luminance feature parameter, and an edge feature parameter are extracted in this exemplary embodiment, when the regions extracted by the image separation processing performed in step S203 are further divided into a number of regions, the reasonable number of feature parameters may be extracted as needed. For example, a line width and a line length may be extracted as feature parameters for the drawing region, and similarly, the number of rows, the number of columns, a height of the rows, and a type of partition line may be extracted as feature parameters for the table region.

Detailed Description of Image Region Separation Processing

Figure 3B:
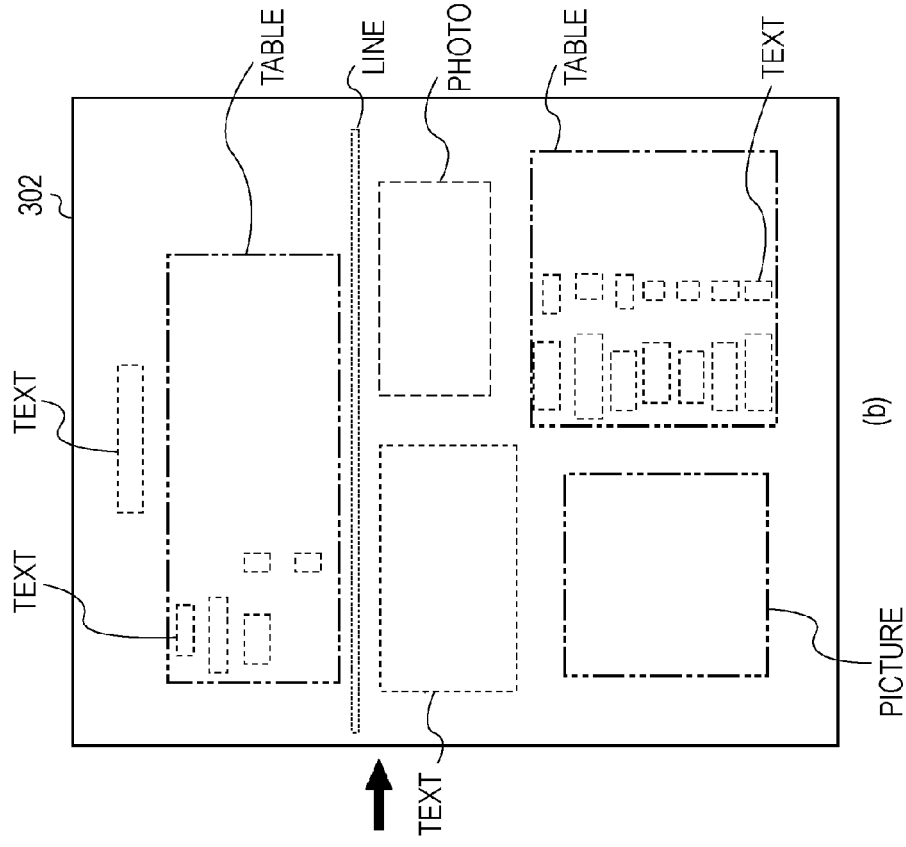
FIGS. 3A and 3B are diagrams illustrating an example of image block extraction processing according to the exemplary embodiment.
Figure 3A:
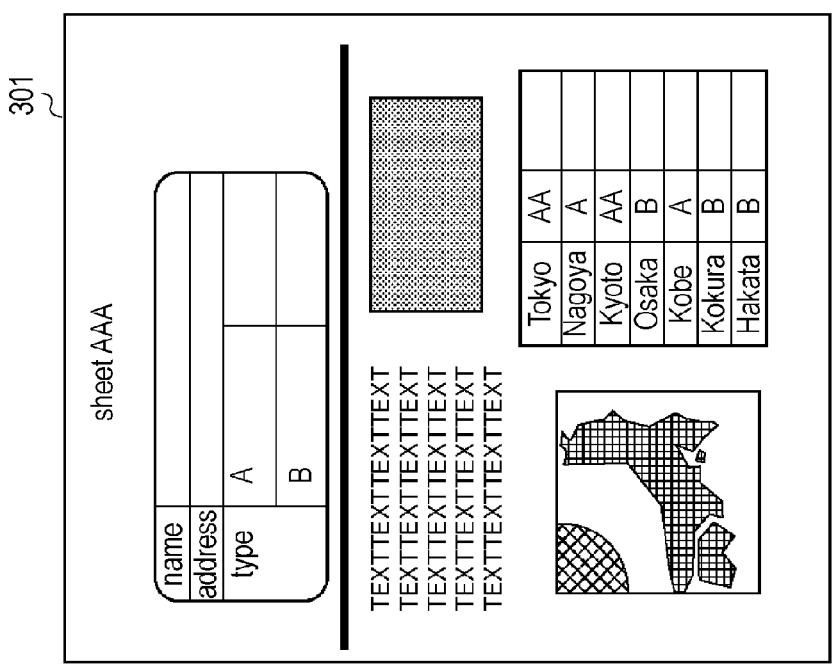

The image region separation processing performed in step S203 will be described in detail with reference to FIGS. 3A and 3B. FIGS. 3A and 3B are diagrams illustrating an example of image block extraction processing according to the exemplary embodiment.

In the image region separation processing, for example, an image 301 shown in FIG. 3A is recognized as a block group 302 including a plurality of meaningful blocks as shown in FIG. 3B. Then, a determination is made as to whether a feature of each of the plurality of meaningful blocks is a "TEXT", a "PICTURE", a "PHOTO", a "LINE", or a "TABLE" so that the plurality of meaningful blocks are categorized by features.

An example of the image region separation processing will now be described in detail. First, an input image is binarized in order to obtain a black and white image, and contour tracing is performed on the black and white image so that groups of pixels surrounded by contours constituted by black pixels are extracted. The contour tracing is further performed on white pixels inside groups of pixels, among the groups of pixels, having large areas, so that groups of white pixels are extracted. Furthermore, groups of black pixels are recursively extracted from groups of white pixels, among the groups of white pixels, having areas equal to or larger than a predetermined area.

The groups of black pixels thus obtained are categorized by sizes or forms, for example, that is, the groups of black pixels are categorized by features. For example, a region having a horizontal to vertical ratio of approximately 1 and having a size within a predetermined range is determined to be a pixel group corresponding to a character, and a region including such characters which are adjacent to one another and which are aligned so as to be readily grouped is determined to be a text block. Groups of pixels other than text blocks are determined to be graphic blocks. Furthermore, among the graphic blocks, a pixel group including linearly arranged pixels is determined to be a line block, a region corresponding to a black pixel group including aligned rectangular white pixel groups which have areas equal to or larger than a predetermined size is determined to be a table block, a region in which pixel groups having irregular forms are scattered is determined to be a photo block, and a pixel group having an arbitrary form other than the irregular forms of the photo block is determined to be a picture block.

Note that, in this exemplary embodiment, the text block and the table block is included in the text regions and the picture block, the photo block, and the line block are included in the graphic regions.

Detailed Description of Image Resolution Selection Processing

Referring to a flowchart shown in FIG. 4, the image resolution selection processing performed in step S206 will be described in detail.

In step S401, the numbers of pixels required for extracting the image feature parameters are obtained. FIG. 5 is an example of a table illustrating the numbers of pixels required for extracting the image feature parameters according to the exemplary embodiment. This table is stored in the HDD 8 or the ROM 6. In FIG. 5, the numbers of pixels required for each of rows and columns of the pixels are shown and are referred to as "the numbers of required pixels". For example, in the table shown in FIG. 5, when a luminance feature parameter is to be obtained from a scanned image data of a color image, an image which includes the number of pixels of 200×200 or more is required. Proper values of the numbers of required pixels can be obtained through experiments using various images.

In this exemplary embodiment, a color image, a grayscale image, and a black and white binary image are shown as examples. In each of the color image, the grayscale image, and the black and white binary image, an amount of noise generated in the image is varied due to whether the image is generated using application software such as word processor software or image processing software or the image is scanned using the scanner. Accordingly, in this exemplary embodiment, the number of required pixels is changed in accordance with a type of image, that is, in accordance with whether the image is an "image obtained by optical scanning" or an "image rendered by an application". In this case, information on a method for or a unit of generating each of the images is registered in advance as generation information after being associated with a corresponding one of the images. In this exemplary embodiment, three image feature parameters, i.e., an image feature parameter relating to color (a color feature parameter), an image feature parameter relating to luminance (a luminance feature parameter), and an image feature parameter relating to an edge (an edge feature parameter), are extracted as examples.

Referring to the table shown in FIG. 5, the number of pixels required for extracting each of the image feature parameters is obtained as the number of required pixels in accordance with the number of colors included in an image of interest, types of image feature parameters to be extracted, and a method for obtaining the image. Accordingly, when a plurality of image feature parameters are extracted, the numbers of pixels are obtained. In this case, among the numbers of pixels, the largest number of pixels is determined to be the number of required pixels. For example, it is assumed that a color feature parameter, a luminance feature parameter, and an edge feature parameter are to be extracted using color image scanned data. In this case, referring to the table shown in FIG. 5, an image having 200 pixels or more is required for extraction of the color feature parameter and the luminance feature parameter, and an image having 300 pixels or more is required for extraction of the edge feature parameter. Accordingly, all the image feature parameters can be extracted from the image having 300 pixels or more, and therefore, 300 is employed and determined as the number of required pixels.

In step S402, resolution calculation processing is performed for obtaining an image resolution required for extracting the image feature parameters. Specifically, an image resolution (hereinafter referred to as a "required resolution") required for extracting the image feature parameters is obtained from the following equation using an area of a region from which the image feature parameters are to be extracted and the number of required pixels obtained in step S401.

$$\text{required\_Resolution} = (\text{minimum\_pixel})/\min(\text{width\_inch}, \text{hight\_inch}) \quad \text{[Equation 1]}$$

Here, "width_inch" and "height_inch" represent a width and height of the region by inches, respectively, and "minimum_pixel" represents the number of required pixels obtained in step S401. That is, the required resolution ("required_Resolution") is obtained by dividing the number of required pixels by one of the width and height which is smaller.

For example, in a case where a region of interest has a width of 2 inches, a height of 3 inches, and the number of required pixels of 300 pixels, a required resolution of 150 DPI is obtained.

In step S403, among resolutions of the generated images, resolutions which are higher than the required resolution obtained in step S402 are obtained, and furthermore, among the resolutions which are higher than the required resolution obtained in step S402, the lowest resolution is determined to be a resolution used to extract the image feature parameters. Then, in step S404, from an image having the determined resolution, a portion of the image (hereinafter referred to as a "portion image") corresponding to a graphic region to be processed (hereinafter referred to as a "region of interest") is extracted. In the image feature parameter extraction processing performed in step S207, image feature parameter calculation processing is performed on the portion image.

As described above, according to the processing performed in steps S203 to S205, among portion images obtained by the image region separation processing, a portion image corresponding to a graphic portion is determined to be a region to be processed, that is, a region to be extracted (a region to be calculated). Then, in step S401, the number of pixels required for obtaining the image feature parameters is determined with reference to the table shown in FIG. 5 in accordance with types of image feature parameters to be extracted. In step S402, a resolution required so that the number of required pixels obtained in step S401 is to be suitable for the region to be processed is calculated using the number of required pixels obtained in step S401 and an area of the region to be processed. Then, in step S403, in accordance with the calculated resolution, an image is selected from among the images of different resolutions stored in the image storing unit 103. In step S404, a portion image which corresponds to the region to be processed is extracted. In an operation of step S207 performed at a later stage, the image feature parameters are extracted from the thus-extracted portion image.

Detailed Description of Image Feature Parameter Extraction Processing

Referring to a flowchart shown in FIG. 6, the image feature parameter extraction processing performed in step S207 will now be described in detail.

In this exemplary embodiment, a description will be made hereinafter assuming that an image feature parameter relating to color (a color feature parameter), an image feature parameter relating to luminance (a luminance feature parameter), and an image feature parameter relating to an edge (an edge image feature parameter) are extracted as examples.

In step S601, it is determined whether the portion image in the region of interest is a color image, a grayscale image, or a black and white binary image. When it is determined that the portion image of the region of interest is a color image, the process proceeds to step S603, when it is determined that the portion image of the region of interest is a grayscale image, the process proceeds to step S608, and it is determined that the portion image of the region of interest is a black and white binary image, the process proceeds to step S602.

When the portion image in the region of interest is a black and white binary image, the black and white binary image is reduced in size in step S602. Before the black and white binary image is reduced in size, an average value of a plurality of pixels included in the image is calculated. Accordingly, the black and white binary image is converted into a grayscale image having pseudo luminance information. For example, when the black and white binary image is reduced in size so that a quarter-size image (an image having a one sixteenth size in area ratio) is obtained, an average value of sixteen pixels is calculated so that the black and white binary image is converted into a grayscale image having sixteen gradation levels. Then, the process proceeds to step S608. Processing the same as performed when the portion image included in the region of interest is determined to be a grayscale image is performed from the step S608 onward. When the portion image included in the region of interest is determined to be a grayscale image in step S601, the process directly proceeds to step S608.

When it is determined that the portion image included in the region of interest is a color image, it is further determined whether the luminance feature parameter or the edge feature parameter is to be extracted in step S603. When it is determined that the luminance feature parameter or the edge feature parameter is to be extracted, the process proceeds to step S604, whereas it is determined that any of the luminance feature parameter and the edge feature parameter is not to be extracted, the process proceeds to step S605.

Since the extraction of the luminance feature parameter or the edge feature parameter is performed using a luminance image, the color image is converted into the luminance image using the following equation in step S604.

$$Y = 0.299 \times R + 0.587 \times G + 0.114 \times B \qquad \text{[Equation 2]}$$

Here, Y denotes a luminance value, and R, G, and B denote values of red, green, and blue in the color image, respectively.

In step S605, it is determined whether a color feature parameter is to be extracted. When it is determined that the color feature parameter is to be extracted, the process proceeds to step S606, whereas when it is determined that a color feature parameter is not to be extracted, the process proceeds to step S608. In step S606, the color feature parameter is extracted. Color feature parameter extraction processing performed in step S606 will be described later in detail. In step S607, the color feature parameter extracted in step S606 is registered in the image feature parameter registration unit 107. Color feature parameter registration processing performed in step S607 will be described later in detail.

Then, in step S608, the image feature parameter extraction unit 106 determines whether the luminance feature parameter is to be extracted. When it is determined that the luminance feature parameter is to be extracted, the process proceeds to step S609, whereas when it is determined that the luminance feature parameter is not to be extracted, the process proceeds to step S611. In step S609, the image feature parameter extraction unit 106 extracts the luminance feature parameter from the portion image included in the region of interest. Luminance feature parameter extraction processing performed in step S609 will be described later in detail. Then, in step S610, the luminance feature parameter extracted in step S609 is registered in the image feature parameter registration unit 107. Luminance feature parameter registration processing performed in step S610 will be described later in detail.

In step S611, the image feature parameter extraction unit 106 determines whether the edge feature parameter is to be extracted. When it is determined that the edge feature parameter is to be extracted, the process proceeds to step S612, whereas when it is determined that the edge feature parameter is not to be extracted, the process is terminated. In step S612, the image feature parameter extraction unit 106 extracts the edge feature parameter from the portion image in the region of interest. Edge feature parameter extraction processing performed in step S612 will be described later in detail. In step S613, the edge feature parameter extracted in step S612 is registered in the image feature parameter registration unit 107. Edge feature parameter registration processing performed in step S613 will be described later in detail.

Detailed Description of Color Feature Parameter Extraction Processing

Figure 7:
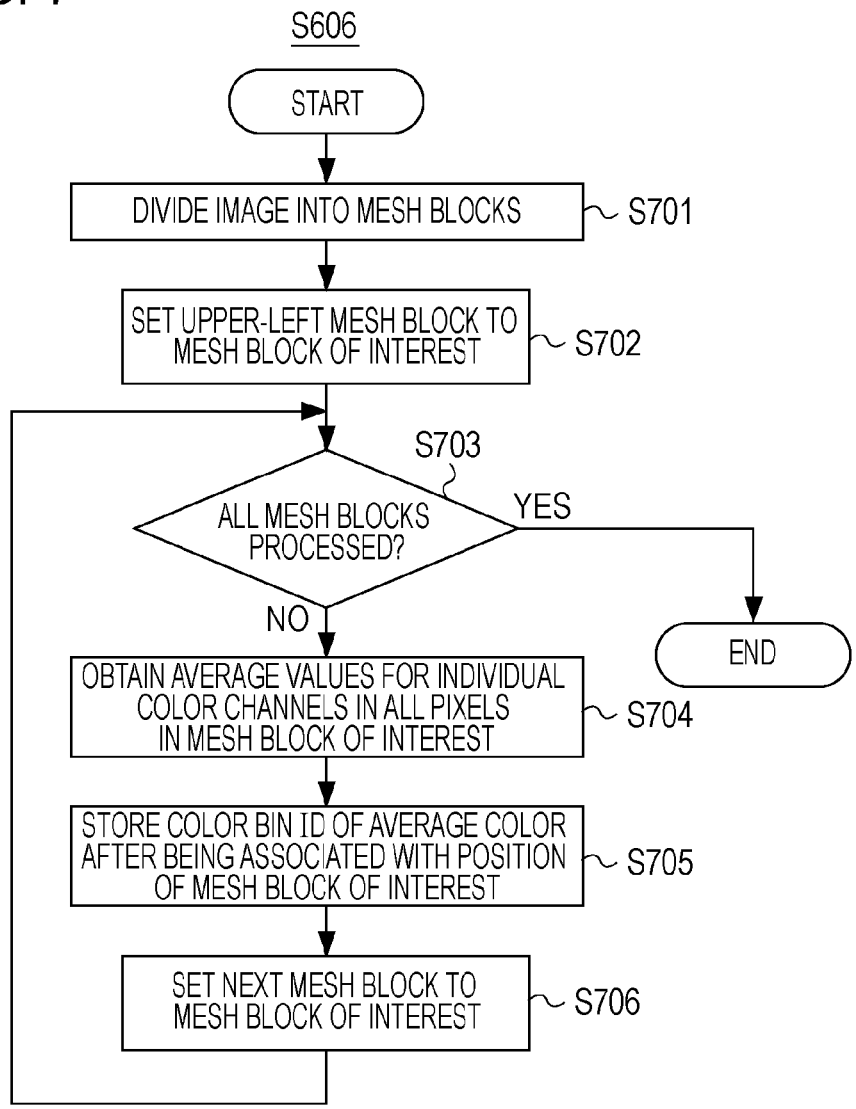
FIG. 7 is a flowchart illustrating color feature parameter extraction processing in detail according to the exemplary embodiment.

Referring to a flowchart shown in FIG. 7, color feature parameter extraction processing performed in step S604 will be described in detail.

Figure 8:
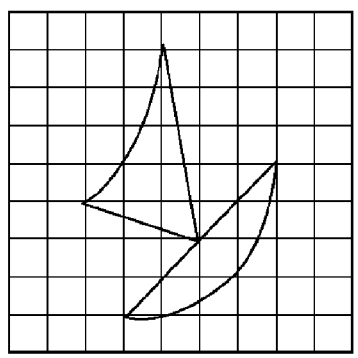
FIG. 8 is a diagram illustrating an example of dividing an image into a plurality of mesh blocks according to the exemplary embodiment.

In step S701, the image feature parameter extraction unit 106 divides the portion image included in the region of interest into a plurality of mesh blocks. FIG. 8 is a diagram illustrating an example of dividing the portion image into the plurality of mesh blocks in this exemplary embodiment. As shown in FIG. 8, the portion image is divided into mesh blocks of 9 rows×9 columns in this exemplary embodiment. Note that although the portion image is divided into 81 mesh blocks constituted by 9 rows×9 columns for simplicity as an example in this exemplary embodiment, the portion image is preferably divided into approximately 225 mesh blocks constituted by 15 rows×15 columns for practical use.

Figures 9, 10:
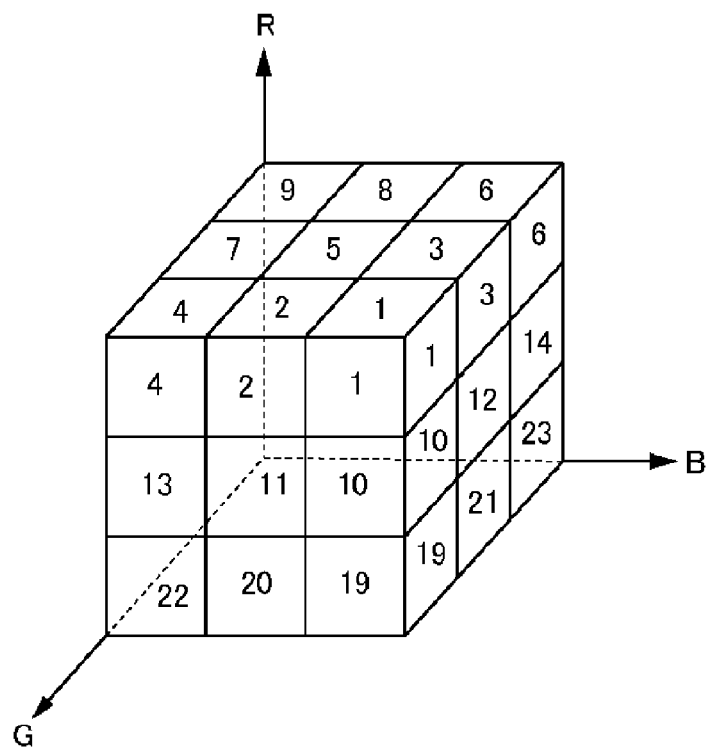
FIG. 9 is a diagram illustrating an example of an order determination table used in the exemplary embodiment.
FIG. 10 is diagram illustrating an example of a configuration of a color bin in a color space according to the exemplary embodiment.

Then, in step S702, among the 81 mesh blocks, a mesh block located at the upper left corner is determined to be a mesh block of interest using the image feature parameter extraction unit 106. Note that the determination of the mesh block of interest is performed with reference to an order determination table shown in FIG. 9, for example, in which a processing order is determined in advance. FIG. 9 is a diagram illustrating an example of the order determination table used in this exemplary embodiment. In the example shown in FIG. 9, scanning is successively performed on each of the rows from left to right starting from the uppermost row to the lowermost row.

Then, in step S703, the image feature parameter extraction unit 106 determines whether all the mesh blocks have been processed. When it is determined that all the mesh blocks have been processed (Yes), the process is terminated. On the other hand, when it is determined that at least one of the mesh blocks which has not been processed is detected (No), the process proceeds to step S704.

In step S704, the image feature parameter extraction unit 106 obtains average values for individual color channels in all the pixels included in the mesh block of interest. In step S705, the image feature parameter extraction unit 106 projects the average values obtained in step S704 to a color bin as shown in FIG. 10 which is a subspace generated by dividing a color space, and a color bin ID is obtained. FIG. 10 is a diagram illustrating an example of a configuration of the color bin in the color space according to this exemplary embodiment. Note that, as shown in FIG. 10, the color bin having an RGB color space divided into 27 (that is, 3×3×3) is employed in this exemplary embodiment. However, a color bin having an RGB color space divided into approximately 216 (6×6×6) is preferably employed for practical use. Then, it is determined that the obtained color bin ID corresponds to a representative color of the mesh block of interest, and the color bin ID is stored after being associated with the mesh block of interest and a position of the mesh block of interest.

In step S706, the image feature parameter extraction unit 106 refers to the order determination table shown in FIG. 9 and sets a mesh block to be processed next as the mesh block of interest. Thereafter, the process returns to step S703, and the processing from step S703 to step S706 described above is repeated until it is determined that all the mesh blocks have been processed.

As described above, information in which the representative colors of the corresponding mesh blocks in the portion image (an image block) to be processed are associated with pieces of position information of the corresponding mesh blocks is extracted as an image feature parameter.

Detailed Description of Luminance Feature Parameter Extraction Processing

Figure 11:
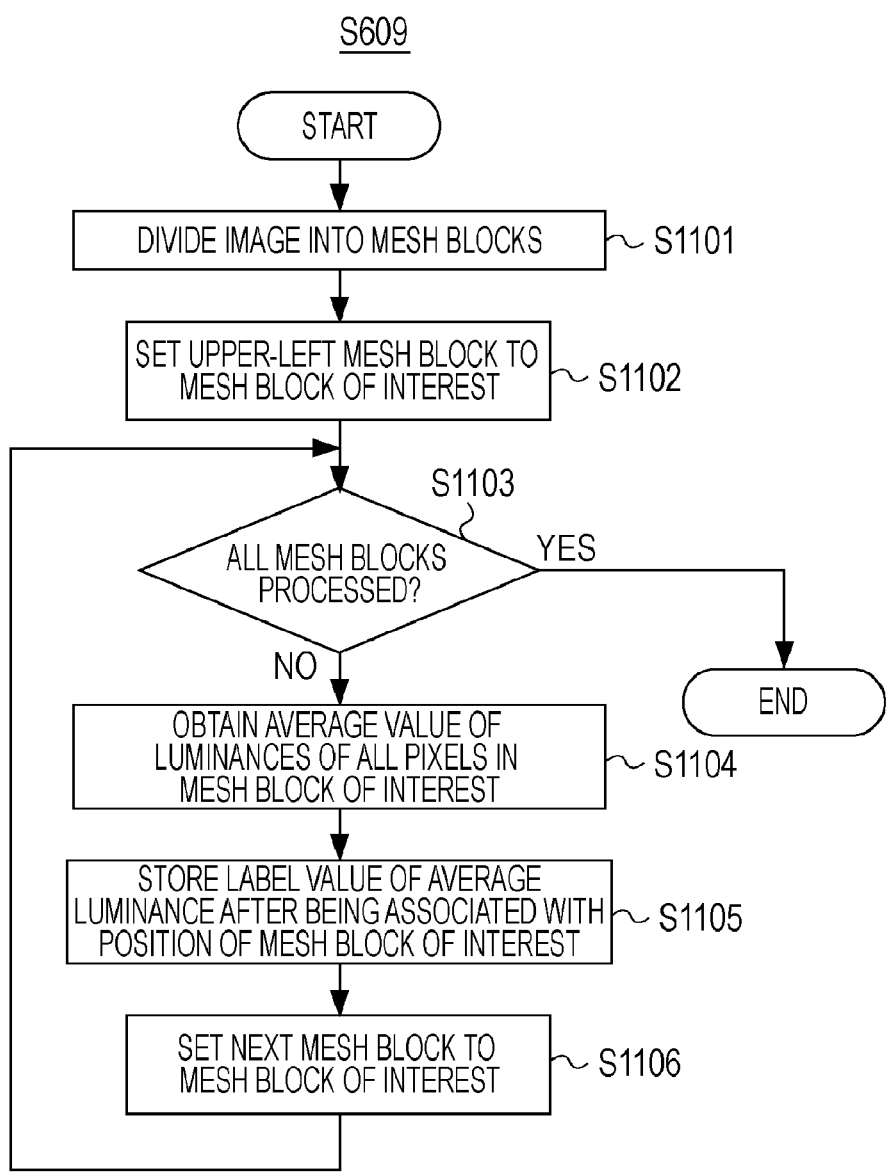
FIG. 11 is a flowchart illustrating luminance feature parameter extraction processing in detail according to the exemplary embodiment.

Referring to a flowchart shown in FIG. 11, the luminance feature parameter extraction processing performed in step S609 will be described in detail.

In step S1101, the image feature parameter extraction unit 106 divides the portion image included in the region of interest into a plurality of mesh blocks. As with the color feature parameter extraction processing, in the luminance feature parameter extraction processing, the portion image is divided into mesh blocks of 9 rows×9 columns in this exemplary embodiment as shown in FIG. 8. Note that, as with the color feature parameter extraction processing, although the portion image is divided into 81 mesh blocks constituted by 9 rows×9 columns for simplicity as an example in this exemplary embodiment, the portion image is preferably divided into approximately 225 mesh blocks constituted by 15 rows×15 columns for practical use.

Then, in step S1102, among the 81 mesh blocks, a mesh block located at the upper left corner is determined to be a mesh block of interest using the image feature parameter extraction unit 106. Note that, as with the color feature parameter extraction processing, the determination of the mesh block of interest is performed with reference to the order determination table shown in FIG. 9, for example, in which a processing order is determined in advance.

In step S1103, the image feature parameter extraction unit 106 determines whether all the mesh blocks have been processed. When it is determined that all the mesh blocks have been processed (Yes), the process is terminated. On the other hand, when it is determined that at least one of the mesh blocks which has not been processed is detected (No), the process proceeds to step S1104.

In step S1104, the image feature parameter extraction unit 106 obtains an average luminance value of all pixels included in the mesh block of interest. Then, in step S1105, the image feature parameter extraction unit 106 obtains a luminance label value using the average luminance value obtained in step S1104 with reference to a luminance label value conversion table shown in FIG. 12. FIG. 12 is a diagram illustrating an example of the table used when a luminance value is converted into a luminance label value according to the exemplary embodiment. This table is stored in the HDD 8 or the ROM 6, for example. Note that, in this exemplary embodiment, a luminance space is divided into eight for luminance values represented by 0 to 255 as shown in FIG. 12. However, the present invention is not limited to this. The luminance space may be divided into 16 or 32, for example. Then, the image feature parameter extraction unit 106 determines that the obtained luminance label value is a representative luminance value of the mesh block of interest, and the representative luminance value is stored after being associated with the mesh block of interest and a position of the mesh block of interest.

Then, in step S1106, the image feature parameter extraction unit 106 refers to the order determination table shown in FIG. 9 and sets a mesh block to be processed next as the mesh block of interest. Thereafter, the process returns to step S1103, and the processing from step S1103 to step S1106 described above is repeated until it is determined that all the mesh blocks have been processed.

As described above, information in which the representative luminance values of the corresponding mesh blocks in the portion image (an image block) to be processed are associated with corresponding pieces of position information of the corresponding mesh blocks is extracted as an image feature parameter.

Detailed Description of Edge Feature Parameter Extraction Processing

Figure 13:
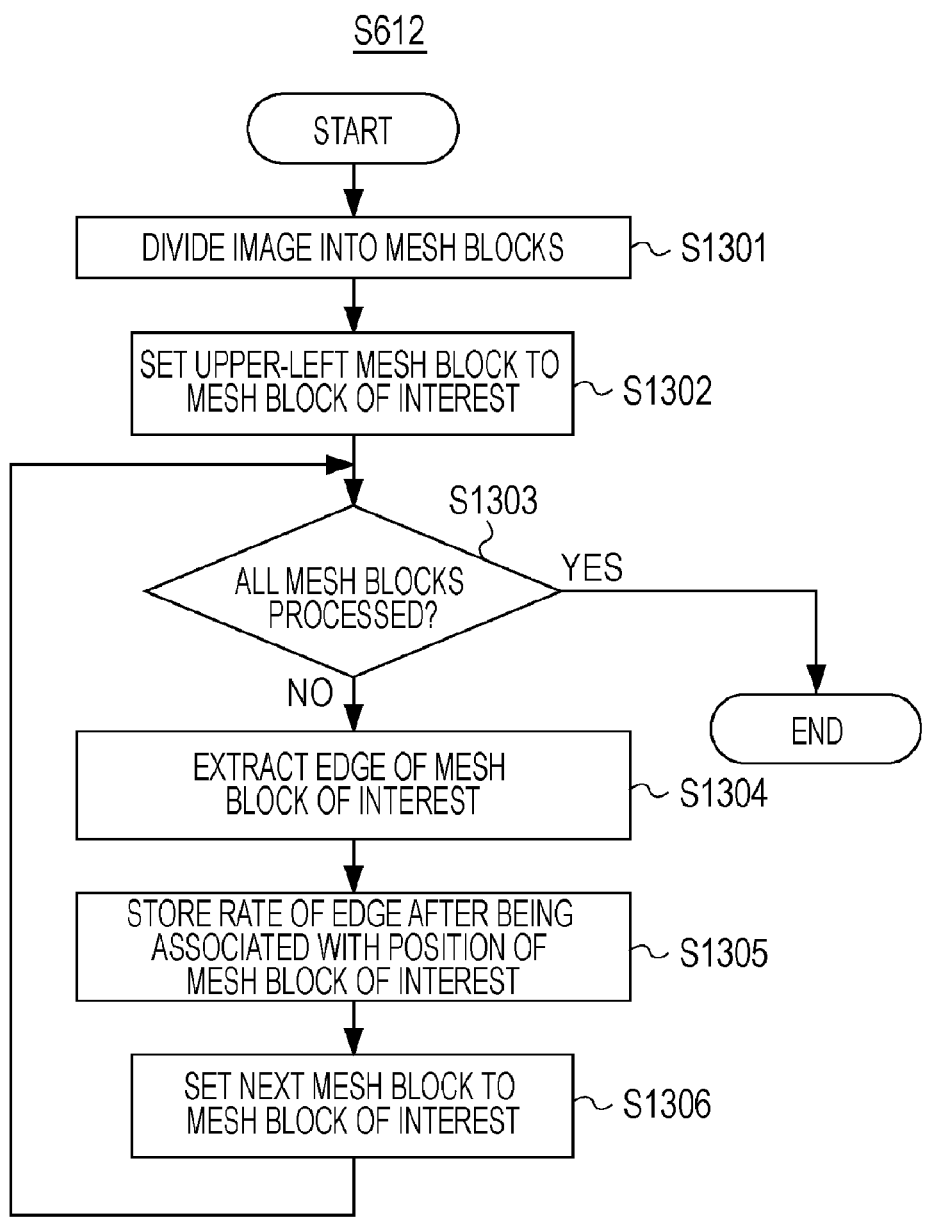
FIG. 13 is a flowchart illustrating edge feature parameter extraction processing in detail according to the exemplary embodiment.

Referring to a flowchart shown in FIG. 13, the edge feature parameter extraction processing performed in step S612 will now be described in detail.

In step S1301, the image feature parameter extraction unit 106 divides the portion image included in the region of interest into a plurality of mesh blocks. As with the color feature parameter extraction processing, in the edge feature parameter extraction processing, the portion image is divided into a plurality of mesh blocks as shown in FIG. 8, and edges are detected from the plurality of mesh blocks. Note that, as with the color feature parameter extraction processing, although the portion image is divided into 81 mesh blocks constituted by 9 rows×9 columns for simplicity as an example in this exemplary embodiment, the portion image is preferably divided into approximately 225 mesh blocks constituted by 15 rows×15 columns for practical use.

In step S1302, among the 81 mesh blocks, a mesh block located at the upper left corner is determined to be a mesh block of interest using the image feature parameter extraction unit 106. Note that the determination of the mesh block of interest is performed with reference to the order determination table shown in FIG. 9, for example, in which a processing order is determined in advance. Then, in step S1303, the image feature parameter extraction unit 106 determines whether all the mesh blocks have been processed. When it is determined that all the mesh blocks have been processed (Yes), the process is terminated. On the other hand, when it is determined that at least one of the mesh blocks which has not been processed is detected (No), the process proceeds to step S1304.

In step S1304, the image feature parameter extraction unit 106 obtains an edge of the mesh block of interest. As a method for extracting an edge, calculation is performed using a differential filter on each of pixels (hereinafter referred to as a "pixel of interest") and pixels surrounding the pixel of interest included in the mesh block of interest. Examples of the differential filter include a Prewitt filter, a Sobel filter, a Robinson filter, and a Kirish filter. In this example, the calculation is performed using the Prewitt filter (refer to FIG. 14).

First, each of the pixel of interest and eight pixels surrounding the pixel of interest is multiplied by a value obtained using the Prewitt filter. Then, a sum of thus-obtained multiplied values is obtained, and edge intensities for individual direction components are obtained. Among the direction components, a direction component having the largest edge intensity is determined to be an edge direction of the pixel of interest and the largest edge intensity is determined to be an edge intensity of the pixel of interest. Note that, when the largest edge intensity is smaller than a predetermined threshold value, it is determined that the pixel of interest does not include an edge.

Then, in step S1305, the image feature parameter extraction unit 106 obtains a rate of pixels which include edges in the mesh block of interest among all the pixels. Normalization is performed assuming that 1 is set when all the pixels include edges. Thereafter, the obtained rate of pixels including edges are determined to be a rate of edges for the mesh block of interest, and the rate of edges for the mesh block of interest is stored after being associated with the mesh block of interest and a position of the mesh block of interest.

Then, in step S1306, the image feature parameter extraction unit 106 refers to the order determination table shown in FIG. 9 and sets a mesh block to be processed next as the mesh block of interest. Thereafter, the process returns to step S1303, and the processing from step S1303 to step S1306 described above is repeated until it is determined that all the mesh blocks have been processed.

As described above, information in which the rates of edges of the mesh blocks in the portion image (an image block) to be processed are associated with pieces of position information of the mesh blocks are extracted as an image feature parameter.

Detailed Description of Feature Parameter Registration Processing

The feature parameter registration processing performed in steps S607, S610, and S613 will now be described in detail.

First, a unique image ID is assigned to the original document image obtained in step S201, and the image ID is stored after being associated with the original document image, the number of reduced images, and reduced images. Note that original image data corresponds to data of the original document image obtained by scanning the original in step S201, and each of the reduced images corresponds to the image obtained in step S202. FIG. 15 is a diagram illustrating an example of pieces of image information which include image IDs, names of original images, the numbers of reduced images, and names of reduced images and which are to be registered. These pieces of image information are stored in the HDD 8, for example.

Then, region IDs are assigned to the individual regions obtained by the image region separation processing performed in step S203. The region IDs are stored after being associated with the corresponding image IDs and region attributes. FIG. 16 is a diagram illustrating examples of pieces of image information which include the image IDs, the region IDs, and region attributes and which are to be registered according to the exemplary embodiment. These pieces of image information are stored in the HDD 8, for example.

Next, image feature parameters for the individual regions are stored after being associated with corresponding pairs of one of the image IDs and one of the region IDs. FIG. 17 is a diagram illustrating an example of pieces of image information which include the image IDs, the region IDs, and the image feature parameters and which are to be registered according to the exemplary embodiment. These pieces of image information are stored in the HDD 8, for example.

Other Exemplary Embodiments

According to the exemplary embodiment described above, the original document image is obtained by scanning, and reduction of the size of the obtained original document image is performed a plurality of times so that the plurality of document images of different resolutions are obtained and stored. However, a plurality of document images of different resolutions may be obtained and stored by electronically reading an image having a layer structure, that is, an image having pieces of information on different resolutions, such as an image generated in accordance with FlashPix, in advance.

According to the exemplary embodiment described above, the RGB color space is used as the color space when the color feature parameter is extracted. However, the color space is not limited to the RGB color space. For example, an Lab color space, an Luv color space, or a JCh color space may be used to extract a color feature parameter. Furthermore, in the exemplary embodiment described above, the representative color is obtained by extracting the average value of the color channels. However, frequencies of appearance of individual colors in a mesh block of interest are calculated, and a color which appears the most often in the mesh block of interest may be employed as the representative color. Alternatively, a color having a maximum value or a color having a minimum value may be employed as the representative color.

As described above, according to the exemplary embodiment described above, when the image feature parameters are to be extracted, an image having an appropriate resolution is selected from among the plurality of images of different resolutions, and the image feature parameters are extracted from the selected image having an appropriate resolution. Accordingly, usable image feature parameters can be extracted at high speed.

Here, a case where image files corresponding to a plurality of images which have the same contents and which have different resolutions are not provided will be described. After a resolution suitable for the number of pixels required for extracting usable feature parameters using the image resolution selection unit 105 is calculated, an image from which the feature parameters are to be extracted is converted into an image of low resolution in accordance with the calculated resolution. In this way, an effect similar to the exemplary embodiment described above is obtained.

The exemplary embodiment is described above in detail. The present invention includes other exemplary embodiments as a system, an apparatus, a method, a program, and a storage medium. Specifically, the present invention may be employed in a system including a plurality of apparatuses, and may be employed in an apparatus constituted by a single device.

Note that the present invention includes a case where a software program is directly supplied or supplied from a remote location to a system or an apparatus, and the system or the apparatus reads and executes the supplied program whereby functions described in the forgoing exemplary embodiment are attained. In this case, the supplied program corresponds to the flowcharts shown in the figures used for description of the exemplary embodiment.

Accordingly, since function processing of the present invention is realized using a computer, the program installed in the computer also realizes the present invention. That is, the present invention includes a computer program which realizes the function processing of the present invention.

In this case, an object code, a program to be executed using an interpreter, and script data to be supplied to an OS (Operation System) may be employed as long as a function of program is attained.

Examples of a computer-readable storage medium used to supply a program include a floppy (registered trademark) disc, a hard disc, an optical disc, a magneto-optical disc, a CD-ROM (compact disc read-only memory), CD-R (compact disc recordable), a CD-RW (compact disc rewritable), a magnetic tape, a nonvolatile memory card, a ROM (read-only memory), and a DVD (digital versatile disc) (DVD-ROM (digital versatile disc read-only memory) and DVD-R (digital versatile disc recordable)).

The program may be supplied by connecting a web site via the Internet using a browser of a client computer so that the computer program of the present invention is downloaded from the web site to a recording medium such as a hard disc. In this case, the program to be downloaded may be a compressed file having an auto-install function. Furthermore, the program may be supplied by dividing a program code constituting the program of the present invention into a plurality of files and downloading the plurality of files from different web sites. That is, a WWW server which allows a plurality of users to download a program file which is used to realize the function processing of the present invention using a computer is also included in the present invention.

The program may be supplied by encoding the program of the present invention, storing the encoded program in a storage medium such as a CD-ROM, and distributing the storage medium to a user. In this case, users who satisfy a predetermined condition may be allowed to download key information used to decode the encoded program from a web site through the Internet, to execute the program decoded using the key information, and to install the program into a computer.

The functions of the exemplary embodiment may be realized by executing the program read using the computer as described above, and in addition, the functions of the exemplary embodiment may be realized by executing the program in cooperation with an OS running in the computer in accordance with the program. In this case, for example, the OS performs part of or all actual processing, and the functions of the exemplary embodiment described above are realized by the processing.

Furthermore, some of or all the functions of the exemplary embodiment described above may be realized by writing the program read from the recording medium to a function expansion board inserted into the computer or to a memory included in a function expansion board connected to the computer. In this case, after the program is written to the function expansion board or the function expansion unit, a CPU included in the function expansion board or the function expansion unit performs part of or all the actual processing, for example.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-105252 filed Apr. 12, 2007, which is hereby incorporated by reference herein in its entirety.

What is claimed is:

1. An image processing apparatus comprising:
   a first storage unit configured to store a plurality of images having the same contents with different resolutions therein;
   an obtaining unit configured to obtain a size of a region to be processed in which a feature parameter is to be calculated and which is a portion of one of the plurality of images;
   a determination unit configured to determine a number of pixels which is required for obtaining the feature parameter, the number of pixels required depending on a type of feature parameter;
   a resolution calculation unit configured to calculate a resolution suitable for the size of the region to be processed obtained using the obtaining unit, from the number of required pixels; and
   a feature parameter calculation unit configured to select an image having the resolution calculated using the resolution calculation unit from among stored images, and to obtain the feature parameter from a portion of the selected image to be processed corresponding to the region to be processed.

2. The image processing apparatus according to claim 1, further comprising:
   a table which stores therein the number of pixels used to calculate the feature parameter, the number of pixels being calculated in accordance with at least one from among a type of feature parameter, the number of colors included in the image to be processed, and generation information of the image to be processed, wherein the determination unit determines the number of required pixels from among the number of pixels in accordance with the table.

3. The image processing apparatus according to claim 1, wherein when a plurality of feature parameters are to be obtained, the feature parameter calculation unit obtains the number of pixels required for extracting the plurality of feature parameters respectively, and the determination unit selects, among the obtained number of pixels, the maximum number of pixels as the number of required pixels.

4. The image processing apparatus according to claim 1, wherein the obtaining unit determines that, among regions obtained using image region separation processing, a region which is determined to be a text region is not the region to be processed.

5. The image processing apparatus according to claim 1, further comprising:
a scanning unit configured to scan an original to obtain a document image; and
a converter configured to change a resolution of the document image obtained using the scanning unit so as to obtain a conversion image,
wherein the first storage unit stores therein the image obtained using the scanning unit and the conversion image in which the resolution thereof is changed using the converter.

6. The image processing apparatus according to claim 1, further comprising:
a second storage unit configured to store the feature parameter calculated using the feature parameter calculation unit after the feature parameter is associated with the image and region information representing the region to be processed.

7. An image processing method comprising:
obtaining a size of a region to be processed in which a feature parameter is to be calculated and which is a portion of one of a plurality of images;
determining a number of pixels which is required for obtaining the feature parameter, the number of pixels required depending on a type of feature parameter;
calculating a resolution suitable for the obtained size of the region to be processed, from the number of required pixels; and
selecting an image having the calculated resolution as an image to be processed from among stored images, and obtaining the feature parameter from a portion of the selected image to be processed corresponding to the region to be processed.

8. A non-transitory computer readable storage medium that stores a program of computer executable instructions which allows a computer to execute operations set forth in claim 7.

* * * * *